United States Patent [19]

Wojtowicz

[11] Patent Number: 4,780,216

[45] Date of Patent: Oct. 25, 1988

[54] CALCIUM HYPOCHLORITE SANITIZING COMPOSITIONS

[75] Inventor: John A. Wojtowicz, Cheshire, Conn.

[73] Assignee: Olin Corporation, Cheshire, Conn.

[21] Appl. No.: 932,423

[22] Filed: Nov. 19, 1986

[51] Int. Cl.$^4$ .......................... C02F 1/76; C01B 11/06
[52] U.S. Cl. .................................... 210/756; 210/759; 210/764; 210/169; 252/186.21; 252/186.43; 252/187.24; 252/187.27; 252/187.28; 252/187.29; 252/187.3; 424/130
[58] Field of Search ...................... 252/187.24, 187.27, 252/187.28, 187.29, 187.3, 186.21, 186.36, 186.37, 186.43; 210/756, 759

[56] References Cited

U.S. PATENT DOCUMENTS

| | | | |
|---|---|---|---|
| Re. 29,473 | 11/1977 | Fitzgerald, Jr. | 252/187.28 X |
| 3,232,869 | 2/1966 | Gard | 210/62 |
| 3,702,398 | 11/1972 | Zsoldos et al. | 210/62 |
| 4,005,031 | 1/1977 | Surmatis | 252/186.24 |
| 4,492,618 | 1/1985 | Eder | 204/152 |
| 4,532,063 | 7/1985 | Gueldenzopf | 252/90 |
| 4,698,124 | 10/1987 | Krulik | 156/642 |

Primary Examiner—Teddy S. Gron
Assistant Examiner—Virginia B. Caress
Attorney, Agent, or Firm—James B. Haglind

[57] ABSTRACT

A sanitizing composition consisting essentially of a mixture of a calcium hypochlorite compound and a peroxydisulfate compound having the formula: $M_xS_2O_8$ where M is an alkali metal or alkaline earth metal, and x is 1 or 2 is employed in treating water to improve pH control and provide increased removal of organic materials.

The compositions provide improved sanitation of water in swimming pools, spas, and cooling towers by efficiently oxidizing organic impurities while helping to minimize the increase in the pH of the water. This permits a reduction in the amount and frequency of addition of acidic compounds such as hydrochloric acid to the water bodies. Further, the incorporation of additives such as algaecides, dispersants, and clarifying agents provides for significant improvements in water quality as evidenced by sparkling pure water.

14 Claims, No Drawings

CALCIUM HYPOCHLORITE SANITIZING COMPOSITIONS

This invention relates to calcium hypochlorite compositions. More particularly, this invention relates to calcium hypochlorite compositions for use in sanitizing water.

Calcium hypochlorite is a well-known source of available chlorine for disinfecting and sanitizing water supplies such as swimming pools, spas, and cooling towers. To sanitize water, calcium hypochlorite is added to or contacted with the water where it effectively provides the required concentrations of available chlorine.

In addition to providing the available chlorine levels required for sanitation, it is necessary for effective treatment to control the pH of the water. For example, to provide a pH which maximizes bather comfort while providing effective sanitation, the pH range in a swimming pool or spa is maintained at from about 7 to about 8. When employing calcium hypochlorite as a sanitizing agent, the pH of swimming pool water tends to drift upward as a result of the release of dissolved carbon dioxide and increased alkalinity introduced by alkaline sanitizers.

At present the pH is controlled by frequent measurement of this value and the addition of an acid compound such as hydrochloric acid to the pool water as required.

While it has long been recognized that it is desirable to combine a compound for reducing the pH of water treated with calcium hypochlorite, the strong oxidizing properties of calcium hypochlorite have severely limited the type and number of materials which could safely be used in mixtures.

The separate addition of chlorine compounds and a peroxy compound oxidizing agent is taught in U.S. Pat. No. 3,702,298, issued Nov., 1972 to F. J. Zsoldos et al. The patent teaches the addition of peroxy compounds to swimming pool water containing multivalent metals such as Ag and Cu to raise the valence of the metals to a level where the metals provide an oxidizing action. To accomplish this, peroxy compounds such as alkali metal persulfates are added to the water in amounts which provide persulfate concentrations ranging from 20 to 400 parts per million. To adjust the pH, an alkaline compound such as sodium bicarbonate, sodium sesquicarbonate, or sodium carbonate is employed. Chlorine or chlorine compounds may also be present as disinfectants in the swimming pool water.

Now it has been found that the control of the pH of water can be greatly enhanced by using a composition consisting essentially of a mixture of a calcium hypochlorite compound and a peroxydisulfate compound having the formula: $M_xS_2O_8$ where M is an alkali metal or alkaline earth metal and x is 1 or 2.

In addition to providing increased pH control to water, the novel composition of the present invention provides additional sanitation by further reducing the concentration of organic materials present.

One component of the novel composition is calcium hypochlorite, a well-known article of commerce. Commercial neutral calcium hypochlorite compounds such as anhydrous calcium hypochlorite contain at least about 65 percent by weight of $Ca(OCl)_2$ and are quite suitable in preparing the novel compositions of the present invention. Also suitably used is "hydrated" calcium hypochlorite containing at least about 55 percent by weight of $Ca(OCl)_2$ and having a water content of from about 4 to about 15 percent. "Hydrated" calcium hypochlorite may be prepared by the methods described, for example, in U.S. Pat. No. 3,544,267, issued to G. R. Dychdala or U.S. Pat. No. 3,669,894, issued to J. P. Faust.

The second component is a peroxydisulfate compound having the formula $M_xS_2O_8$, where M is an alkali metal or alkaline earth metal, and x is 1 or 2. X is dependent on the valency of the metal and is 2 for alkali metals and 1 for alkaline earth metals.

Suitable peroxydisulfate compounds include alkali metals such as sodium, potassium, and lithium; and alkaline earth metals including calcium and magnesium may be used as well as mixtures of alkali metal and alkaline earth metal peroxydisulfates.

The novel compositions may contain any suitable proportion of the peroxydisulfate compound which is effective in maintaining the pH constant or reducing the increase in pH of the water. Suitable proportions include from about 1 to about 50 percent by weight of the composition. Where the composition is used in water bodies such as swimming pools, preferred amounts include those in the range of from about 5 to about 30 percent by weight. When used in treating water bodies having higher temperatures such as spas, preferred proportions of the peroxydisulfate compound include those of from about 10 to about 50 percent by weight.

The compositions of the present invention may be produced in any suitable form such as granules, pellets, sticks, or tablets.

When added to the water body to be treated, the novel composition of the present invention disinfects the water by oxidizing organic materials and chloramine-forming compounds present. The hypochlorite ion and the persulfate ion are also decomposed photolytically by sunlight, and periodic supplementation of the composition is necessary to provide effective sanitizing action.

The novel compositions of the present invention may include additives such as algaecides, clarifying agents for the removal of suspended solids, dispersants or antiscalents for alkaline earth metal elements, and flocculants for colloidally dispersed matter. These additives could be present in amounts from about 1 to about 15 percent by weight of the sanitizing compositions.

Suitable algaecides which can be incorporated in the compositions include, for example, quaternary ammonium compounds, bis(ethylamino-)chloro-s-triazine, halogenated quinones, carbamates, poly[oxyethylene(dimethylimino) ethylene(dimethylimino)ethylene dichloride], and copper chelates with ethylenediaminetetracetic acid (EDTA), triethanolamine (TEA), gluconic acid, or citric acid.

Dispersants or antiscalents which can be employed are exemplified by alkali metal tripolyphosphates, alkali metal hexametaphosphates, alkali metal pyrophosphates, alkali metal salts of hydroxyethylenediphosphonic acid, and low molecular weight polyacrylates.

Clarifying agents which are suitable for use include high molecular weight polyacrylates and polyacrylamides.

In addition, flocculants such as an alkali metal silicate or an alkali metal aluminate may be used.

It will be recognized that, unlike the peroxydisulfate compounds, certain of these additives are potentially reactive with calcium hypochlorite. Additives such as the quaternary ammonium compounds used as algaecides would require, for example, a protective coating or encapsulation when employed in the compositions of the present invention.

The novel compositions of the present invention provide improved sanitation of water in swimming pools, spas, and cooling towers by efficiently oxidizing organic impurities while helping to minimize the increase in the pH of the water. This permits a reduction in the amount and frequency of addition of acidic compounds such as hydrochloric acid to the water bodies. Further, the incorporation of additives such as algaecides, dispersants, and clarifying agents provides for significant improvements in water quality as evidenced by sparkling pure water.

The compositions of the present invention can be used in water bodies such as swimming pools or spas which employ, for example, cyanuric acid as a stabilizing agent as cyanuric acid does not react with the persulfate compound present.

The following examples are presented to illustrate the invention more fully. All parts and percentages are by weight unless otherwise specified.

EXAMPLE 1

Two outdoor 7500 gallon swimming pools were maintained at 80° F. and the water circulated continuously. To each pool 120 mls of an aqueous solution (synthetic bather insult) having the following composition was added daily: NaCl 10.0, KCl 1.0, $Na_2SO_4$ 0.2, $MgSO_4$ 2.0 $CaCl_2$ 0.1, glucose 0.3, lactic acid 2.0, pyruvic acid 0.1, urea 7.3, and creatinine 0.4 grams per liter. The pH of the solution was adjusted to 7.5 with $NH_4OH$. The control pool was treated every other day with 64 g of 65 percent $Ca(OCl)_2$ and the test pool with 64 g of an 80/20 percent by weight mixture of $Ca(OCl)_2$ and $Na_2S_2O_8$. After 10 days the pH of the test pool was 7.90, 0.12 lower than the pH of 8.02 of the control pool. A similar result was obtained when the role of the two pools was reversed. The combined available chlorine level in both pools remained below about 0.2 parts per million showing that nitrogen-containing compounds such as ammonium salt, urea, and creatinine were effectively oxidized.

EXAMPLE 2

Aqueous solutions, in closed 500 ml glass vessels, having the compositions: (A) 50 ppm $Na_2S_2O_8$, 13 ppm isopropanol, 50 ppm of cyanuric acid, and having an alkalinity concentration of 80 ppm; and (B) 50 ppm $Na_2S_2O_8$, 50 ppm of cyanuric acid, and having an alkalinity concentration of 80 ppm, were exposed to light from a carbon arc as simulated sunlight for four hours at 90° F. In solution A, the $Na_2S_2O_8$ essentially completely oxidized the isopropanol to acetone and formed an equivalent amount of sodium bisulfate. In solution B, without the presence of isopropanol, less sodium persulfate was decomposed. The results are given in TABLE I below.

TABLE I

| Run No. | $Na_2S_2O_8$ (ppm) Initial | Final | Acetone (ppm) Initial | Final | pH Initial | Final |
|---|---|---|---|---|---|---|
| A | 50 | 1 | 13 | 1 | 7.40 | 6.70 |
| B | 50 | 30 | — | — | 7.40 | 6.95 |

This example shows that the presence of organic compounds in pool water are oxidized and further that this oxidation reaction results in a lowering of the pH below that resulting from photolytic decomposition alone.

EXAMPLE 3

Twenty gram samples of mixtures of 65 percent $Ca(OCl)_2$, ($-840/+595$ microns) and $Na_2S_2O_8$ ($-420/+297$ microns) in 30 ml sealed septum vials were placed in a forced convection oven maintained at a temperature of 45°C. After 10 days the samples were removed and the gas in the head space analyzed for chlorine. The vials were then opened, the sample screened to separate the $Ca(OCl)_2$ from the $Na_2S_2O_8$, and the two sieve cuts analyzed for average chlorine content and sodium persulfate assay, respectively. The results are shown below in TABLE II.

TABLE II

| Percent $Na_2S_2O_8$ | Head Gas Percent $Cl_2$ | $Ca(OCl)_2$ Δ Percent Available Chlorine | $Na_2S_2O_8$ Percent Assay |
|---|---|---|---|
| 0 | 0 | 6.5 | — |
| 10 | 0 | 7.0 | 99 |
| 15 | 0 | 6.7 | 99 |
| 20 | 0 | 6.7 | 99 |

This example illustrates that in the composition of the present invention both calcium hypochlorite and sodium peroxydisulfate are stable.

What is claimed is:

1. A sanitizing composition consisting essentially of a mixture of a calcium hypochlorite compound and a peroxydisulfate compound having the formula: $M_xS_2O_8$ where M is an alkali metal or alkaline earth metal, and x is 1 or 2.

2. The sanitizing composition of claim 1 in which the calcium hypochlorite compound is anhydrous calcium hypochlorite or hydrated calcium hypochlorite.

3. The sanitizing composition of claim 1 in which M is an alkali metal and x is 2.

4. The sanitizing composition of claim 1 in which the concentration of peroxydisulfate compound is from about 1 to about 50 percent by weight.

5. The sanitizing composition of claim 4 in which the calcium hypochlorite compound is a hydrated calcium hypochlorite having a water content of from about 4 to about 15 percent by weight.

6. The sanitizing composition of claim 3 in which the alkali metal is sodium or potassium.

7. The sanitizing composition of claim 1 in which an algaecide is included.

8. The sanitizing composition of claim 1 in which a clarifying agent is included.

9. The sanitizing composition of claim 1 in which a dispersant is included.

10. The sanitizing composition of claim 1 in which the mixture is in a compressed form.

11. The sanitizing composition of claim 1 in which a flocculant is included.

12. The sanitizing composition of claim 3 in which an algaecide and a dispersant are included.

13. A method of sanitizing water in facilities selected from the group consisting of swimming pools, spas, and cooling towers which comprises contacting the water with the composition of claim 1.

14. In a calcium hypochlorite composition for sanitizing water the improvement which consists of admixing a peroxydisulfate compound having the formula $M_xS_2O_8$ where M is an alkali metal or alkaline earth metal and x is 1 or 2.

* * * * *